Oct. 3, 1967  B. EDWARDS  3,344,948
CLOSURE FOR SPIN SEALING AND COIN FEEDING
Filed Dec. 8, 1965
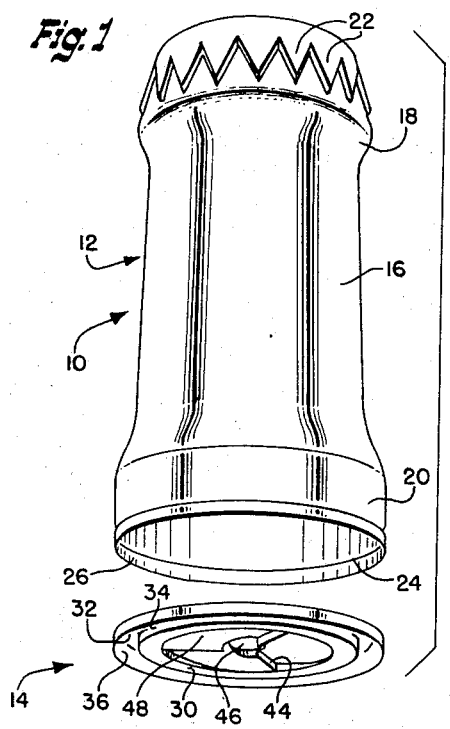
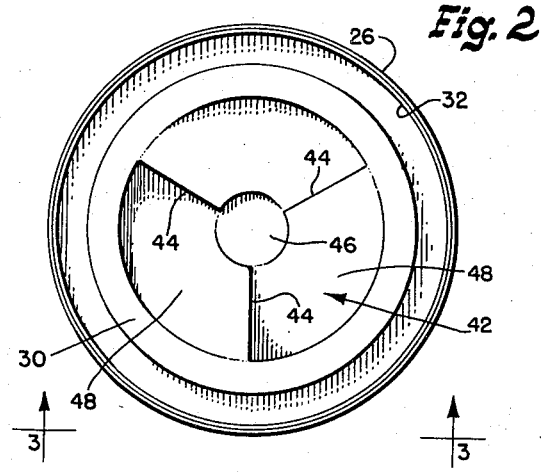
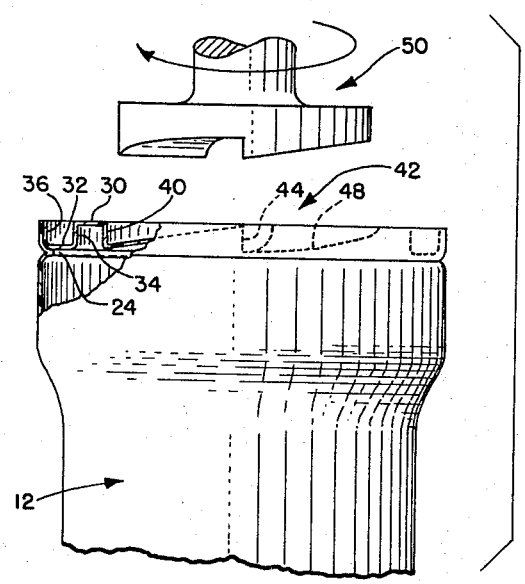
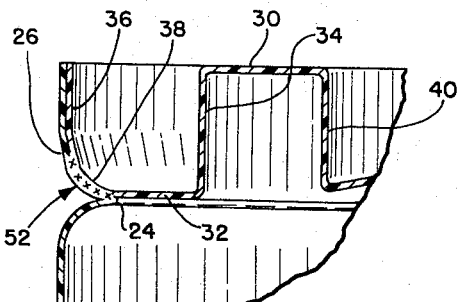
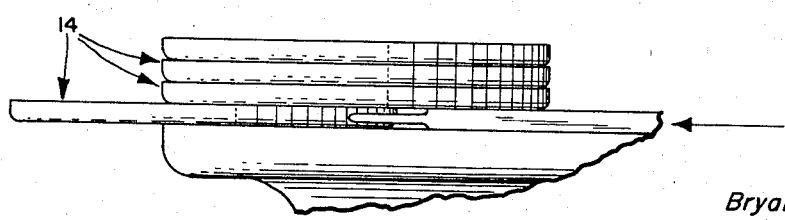
INVENTOR.
Bryant Edwards
BY
His Att'ys United States Patent Office 3,344,948
Patented Oct. 3, 1967

3,344,948
CLOSURE FOR SPIN SEALING AND COIN FEEDING
Bryant Edwards, Clarendon Hills, Ill., assignor to Illinois Tool Works Inc., Chicago, Ill., a corporation of Delaware
Filed Dec. 8, 1965, Ser. No. 512,391
10 Claims. (Cl. 220—67)

The present invention relates to a one-piece thin-wall thermoplastic closure member of novel construction, and more particularly, to a closure member of the above described type which can be spin sealed or welded to a complementary container body as well as separated from an adjacent similar configured closure by coined feeding thereof.

There are various well known techniques for joining or uniting thermoplastic articles to one another including, for example, the use of adhesives or solvents, mechanical interlocking, the application of heat, spin sealing or welding and the like. Where the thermoplastic articles become extremely thin-walled in nature, such as disposable containers and lid members on the order of .002–.034 inch in thickness, it becomes more difficult to unite or join them together particularly by such techniques a spin sealing or welding requiring relative engaging movement of one or both articles to generate enough heat to fuse or molecularly bond the article to another. It is recognized, however, that spin sealing or welding techniques can be advantageously employed in achieving an impermeable air and moisture barrier. Many household cleansing powders contain chlorine salts which, if exposed to moisture, cause the powders to cake and stick within the container thereby making dispensing of the container contents quite difficult.

Spin sealing or welding techniques require sufficient heat to be generated by friction developed in the areas of the articles to be joined such that fusion takes place. Frictional engagement of the articles is accomplished by relatively moving the articles with respect to one another, and with the very fragile nature of thin-walled articles, care must be exercised in engaging and relatively moving the articles with respect to one another.

Thin-wall thermoplastic closure members with which the present invention is concerned are used in large quantities, and this imposes additional requirements in handling and separating similarly configured closure members from each other. In the usual case, a plurality of closure members are arranged in a vertical stack, and are individually dispensed and positioned within a complementary container body, and then joined or united thereto by such techniques as above discussed. Even where a thin-wall closure member has been suitably configured to enable spin sealing or welding thereof to a complementary container body, it may not be satisfactory unless it also is capable of freely separating from a stack of similarly configured closures.

Accordingly, it is an object of the present invention to provide a one-piece thin-wall thermoplastic closure or lid member which can be coin fed from a stack of similarly configured closures, and spin sealed or welded to a complementary container body.

Another object of the present invention is the provision of a thermoplastic lid or closure member of the foregoing type which facilitates the introduction and alignment of a complementary driving member relative to designated parts of the closure member for positive driving engagement therewith.

A further object of the present invention is to provide a lid or closure member permitting the stacking of a plurality of similarly configured closure members with respect to one another while enabling coin feeding of the closures without partial telescoping engagement or nesting.

Yet another object of the present invention is the provision of a thermoplastic lid or closure member as used to a complementary container body in a manner to provide a strong-leakproof and hermetic joint or connection therebetween.

A still further object of the present invention is the provision of a thermoplastic lid or closure member which can be easily and economically manufactured by any one of a number of well known molding techniques, and which is otherwise well adapted for the purposes intended.

The foregoing and other objects and advantages will become more apparent from the following description when read in connection with the accompanying drawing wherein:

FIG. 1 is an exploded perspective view of a container package including a container body and a closure or lid member as constructed in accordance with the principles of the present invention;

FIG. 2 is a bottom plan view of the container package shown in FIG. 1 with the closure or lid member assembled to the container body;

FIG. 3 is a fragmentary elevational view, partially in section, of the container package shown in FIG. 1 as viewed along line 3—3 of FIG. 2;

FIG. 4 is an enlarged fragmentary sectional view illustrating the area in which the lid or closure member and the container body are sealed to one another; and FIG. 5 is a fragmentary side elevational view showing a plurality of lid members constructed in accordance with the present invention arranged in a vertical stack, and illustrating the removal of the lowermost lid or closure member from the stack.

In the discussion that follows, it will be understood that the embodiment shown in the drawing is the preferred form though various other modifications and constructions are possible, and are to be considered as coming within the purview of the present invention.

As previously indicated, the present invention deals with improvements in thin-wall thermoplastic articles such as would comprise a container package generally identified by reference numeral 10 in FIG. 1 of the drawing. Container package 10 is particularly suited as a dispensing container for cleansing powders and the like, and includes an integrally molded container body 12 and a bottom closure or lid member 14. The container body 12 is integrally molded in one piece preferably by a plug-assist blow molding technique, and thus is hollow in construction. The container body sidewall 16 is generally cylindrical in form, and increases in diametrical size at each of the container body ends to provide upper and lower angular enlargements 18, 20 respectively.

The upper enlargement 18 of the container body 12 has a generally frusto-conical shape including an interconnected series of outwardly protruding teeth formations 22 which, together with the generally frusto-conical shape of the upper enlargement 18, provide increased lateral strength to the container in the vicinity of its upper end. For dispensing of the container contents, a plurality of openings (not shown) are provided in the end or top wall of the container. The lower enlargement 20 of the container body 12 is generally annular in form, and includes as a part thereof, a circumferentially extending, inwardly directed shoulder or undercut formation 24 against which the lid or closure member 14 abuts. The axial dimension between the shoulder or internal undercut formation 24 and the lowermost extremity of the lower enlargement 20 is preferably such that the closure or lid member 14 is capable of being mounted within the container body 12 in a manner best shown in FIGS. 3–4 of the drawing. The closure or lid member 14 rests or abuts against an area of support 26 which includes, as a major part thereof, the outer or external shoulder area of the internal undercut formation 24. The area of support 26 corresponds in shape to one portion of the closure or lid member 14 as will be set forth in detail below.

The container body 12 may be varied in size, shape and design to suit the particulars required. As an example, the container body 12 may be of the type capable of nesting with other body portions of like configuration such as shown in U.S. Patent No. 3,168,222 dated Feb. 2, 1965. This is considered exemplary of the various modifications that are possible within the scope of the present invention.

The important aspect of the present invention is the closure or lid member 14 and the manner in which it cooperates with a complementary container body, various forms of which have heretofore been discussed. The closure or lid member 14, which is the bottom of the container package 10 shown in FIG. 1 of the drawing, is integrally molded as a one-piece seamless article. This closure or lid member 14 includes top and bottom planar wall portions 30, 32 respectively which are integrally joined to one another by generally axially extending wall portion 34. Spaced from and extending generally in the same manner as wall portion 34 is an upwardly projecting skirt portion 36, the axial height of which is preferably not greater than that of the axially extending wall portion 34. The area of juncture 38 of the skirt portion 36 and the bottom planar wall portion 34 is complementary in shape to the area of support 26 provided on the container body 12. In the form shown in the drawing, the area of support 26 and the area of juncture 38 are generally curvilinear in shape to afford sufficient contacting area therebetween to enhance the fusion of the container body 12 and the closure or lid member 14 by spin sealing techniques to be discussed hereinafter. A second generally axially extending wall portion 40 is integrally joined to the top planar wall portion 30, and is spaced from, but generally parallel with the wall portion 34.

Wall portion 40 of the closure or lid member 12 is connected in integral fashion to a tool engaging area 42 which is substantially centrally located on the lid or closure member 14. The tool engaging area 42 includes a plurality of circumferentially spaced, radially directed shoulders or abutment elements 44 radiating outwardly from a central hub portion 46. In the embodiment shown, there are three radially directed shoulder or abutment elements 44 which are equally spaced around the periphery of the central hub portion 46. It is to be understood that the number of these radially directed shoulder or abutment elements 44 may be varied as desired.

The axial dimension of each radially directed shoulder or abutment element 44 is substantially equal to the distance separating the top and bottom planar wall portions 30, 32 respectively. As a result, there will be no upstanding elements which would interfere with coin feeding or dispensing of similarly configured closure or lid members from a vertical stack as depicted in FIG. 5 of the drawing. In this latter regard, it is to be noted that various elements of the closure or lid construction prevent partial telescoping or nesting of lid members when removed from a vertical stack. In particular, it will be seen that the top planar wall portion 30 is generally co-planar with the outer free extremity of the outwardly projecting skirt portion 36 as well as the upper extremities of each of the radially directed shoulders or abutment elements 44. Further, the lower extremities of the radially directed shoulders or abutment elements 44 are also generally co-planar with the bottom planar wall portion 32. As a result, when a similarly configured closure member is superimposed thereon, the co-planar upper areas of the subjacent lid will contact in sliding fashion the co-planar bottom areas of the superimposed lids to permit unimpeded removal of the subjacent or lowermost lid. This unimpeded removal or dispensing of lids has come to be known as "coin feeding" lid dispensing.

To further enhance the coin feeding aspects of the present invention, the lid or closure member 14 in the area of juncture between the wall portion 44 and the planar wall portion 32 may be undercut as described in detail in Ser. No. 306,857 filed Sept. 5, 1963, now Patent No. 3,237,800. By undercutting the wall portion 34, the "gap" between the top planar portion 30 and the upper extremity of the upwardly projecting skirt portion 36 will be reduced in size to a point where it is substantially smaller than the radial dimension of bottom planar wall portion 32.

The tool engaging area 42 is further provided with a circumferentially disposed connecting wall 48 intermediate adjacent radially directed shoulders or abutment elements 44. Each connecting wall 48 is configured to facilitate introduction and alignment of a rotating tool member 50 generally complementary to the tool engaging area 42, and having confronting tool faces which are adapted to engage the radially directed shoulders or abutment elements 44. In the embodiment shown, each connecting wall 48 extends from a high point adjacent one radially directed shoulder and curves generally toward a low point in the vicinity of the base or lower extremity of a next adjacent radially directed shoulder 44 to enable the confronting tool engaging faces of the tool member 50 to be readily moved into alignment with the radially directed shoulders 44. Preferably, each connecting wall extends first laterally outwardly in generally the same plane as the upper extremity of one radially directed shoulder so as to provide a large bearing area facilitating coin feeding of stacked lids.

The tolerances established between the container body 12 and the closure member 14 are such that upon imparting rotary movement to the closure member 14 by way of the tool 50, the container portion 26 and closure portion 38 generate sufficient heat to cause fusion of the closure and container body to each other.

The fused area between the closure and container body is identified 52 in FIG. 4 of the drawing, and it will be seen that this is an appreciable area over which the respective articles are joined to each other creating a relatively strong as well as an air-tight, leakproof seal.

It will, of course, be recognized that the joining or uniting of the container body and closure member is performed in the above described manner only after the container body has been appropriately filled with cleansing powders or the like. The filling of the container body and the joining of the closure member thereto is accomplished while the container body is in inverted position. Once this has been achieved, the container package is ready to be packed in a shipping carton. It will be understood that suitable pressure sensitive tape or other similar means may be employed to close the openings (not shown) provided in the top wall of the container body to prevent egress of the contents thereof until desired by the ultimate consumer.

It will now be apparent that the present invention provides an improved lid construction which not only facilitates coin feeding from a stack of similarly configured lids, but enables the spin sealing of a lid member to a complementary container body. The specific embodiment disclosed is merely for exemplary purposes only as various modifications thereof are possible. As one example, the lid or closure member may be turned 180 degrees from that shown in the drawing and then spin sealed to the complementary container body. Other changes in structure will be apparent to those skilled in the art, and will be understood as forming a part of the present invention insofar as they fall within the spirit of the appended claims.

What is claimed is:

1. A one-piece thermoplastic closure member for covering the open mouth of a complementary container body comprising, first and second circumferentially extending, axially spaced planar wall portions laterally outwardly offset from the closure axis and being joined to one another by a generally axially extending wall portion, a circumferential series of radially directed shoulders laterally inwardly offset from said first and second planar wall portion, each radially directed shoulder having an axial height substantially equal to the distance between said first and second planar wall portions to enable the coin feeding of said closure member from a stack of similarly configured closure members, and a circumferentially disposed connecting surface intermediate adjacent radially directed shoulders each sloping from a high point adjacent an upper end of one radially directed shoulder toward a low point in the vicinity of a lower end on a next adjacent radially directed shoulder to facilitate alignment of a complementary tool means with said radially directed shoulders for positive coacting engagement therewith in spin sealing said closure member relative to said complementary container body as an incident to rotary movement thereof.

2. A closure member as defined in claim 1 wherein each circumferentially disposed connecting surface extends first laterally away from the upper end of one radially directed shoulder and then gently slopes downwardly therefrom for merger with the lower end on a next adjacent radially directed shoulder to provide an appreciable bearing area adjacent the upper end of each radially directed shoulder and facilitate coin feeding of adjacent stacked similar closure members from each other.

3. The closure member as defined in claim 1 wherein each of said radially directed shoulders terminates short of said container axis and is joined to a centrally located hub portion having its upper surface generally aligned with the uppermost planar wall portion.

4. The closure member as defined in claim 1 wherein there are at least two radially directed shoulders each equally spaced from one another.

5. The closure member as defined in claim 1 wherein said first and second planar wall portions comprise the top and bottom areas of said closure member.

6. The closure member as defined in claim 5 wherein said bottom planar wall portion is laterally outwardly offset from said bottom planar wall area.

7. The closure member as defined in claim 6 wherein said bottom planar wall area is integrally connected to an upwardly projecting skirt portion, the upper end of which is generally co-planar with said bottom planar wall portion.

8. In combination, a closure of the tye defined in claim 7, and a hollow thermoplastic container body having a closed upper end and an open lower end, a circumferentially extending internally formed shoulder adjacent the lower open end of said container against which the lower end of said skirt portion rests.

9. The combination as defined in claim 8 wherein said internally formed shoulder is axially spaced from the lower open end of said container body by a dimension substantially equal to the height of the skirt portion of said closure member to enable the radially directed shoulders and the planar wall portion generally aligned therewith to aid in supporting the container body in an upright position.

10. The closure member as defined in claim 1 made from a thermoplastic material which, upon frictionally engaging a complementary container body also made from thermoplastic material, generates sufficient heat therebetween to cause spin sealing of said closure and container to each other.

References Cited
UNITED STATES PATENTS

| | | | |
|---|---|---|---|
| 2,723,779 | 11/1955 | Parker. | |
| 3,194,479 | 7/1965 | Rumberger | 229—48 X |
| 3,215,300 | 11/1965 | Lynch | 220—97 X |
| 3,275,179 | 9/1966 | Lux | 215—1 X |
| 3,276,657 | 10/1966 | Speas | 220—97 X |
| 3,317,110 | 5/1967 | Palmer | 220—60 X |
| 3,321,104 | 5/1967 | Edwards | 220—97 |

THERON E. CONDON, *Primary Examiner.*

G. E. LOWRANCE, *Assistant Examiner.*